(12) United States Patent
Nagoshi et al.

(10) Patent No.: US 9,702,286 B2
(45) Date of Patent: Jul. 11, 2017

(54) EXHAUST GAS PURIFICATION SYSTEM AND EXHAUST GAS PURIFICATION METHOD

(71) Applicant: MAZDA MOTOR CORPORATION, Hiroshima (JP)

(72) Inventors: Masahiro Nagoshi, Hiroshima (JP); Masayuki Tetsuno, Hiroshima (JP); Yoshio Mizuta, Hiroshima (JP); Kohei Fujii, Hatsukaichi (JP); Hiroshi Yamada, Hiroshima (JP); Koichiro Harada, Hiroshima (JP); Yoshiyuki Sato, Hiroshima (JP); Akihide Takami, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/924,066

(22) Filed: Oct. 27, 2015

(65) Prior Publication Data
US 2016/0121266 A1    May 5, 2016

(30) Foreign Application Priority Data
Nov. 5, 2014    (JP) .................................. 2014-225375

(51) Int. Cl.
*B01D 53/92* (2006.01)
*B01D 53/94* (2006.01)
(Continued)

(52) U.S. Cl.
CPC ....... *F01N 3/0821* (2013.01); *B01D 53/9409* (2013.01); *B01D 53/9477* (2013.01); *F01N 3/035* (2013.01); *F01N 3/0814* (2013.01); *F01N 3/0842* (2013.01); *F01N 3/103* (2013.01); *F01N 3/106* (2013.01); *F01N 3/2066* (2013.01); *F01N 13/0097* (2014.06); *B01D 2251/2067* (2013.01); *B01D 2255/1021* (2013.01); *B01D 2255/1023* (2013.01); *B01D 2255/2042* (2013.01); *B01D 2255/2065* (2013.01);
(Continued)

(58) Field of Classification Search
CPC ...... B01D 53/92; B01D 53/94; B01D 53/944; B01D 53/9418; B01D 53/9422; B01D 53/9459; B01D 53/9477; F01N 3/035; F01N 3/0814; F01N 3/0842; F01N 3/2066; F01N 3/101; F01N 2250/02
See application file for complete search history.

(56) References Cited

U.S. PATENT DOCUMENTS 5,746,989 A     5/1998  Murachi et al.
6,805,849 B1   10/2004  Andreasson et al.
(Continued)

FOREIGN PATENT DOCUMENTS

BR    PI0908461 A2 * 12/2015  ......... B01D 53/9445
FR    3029969 A1 *  6/2016  ........... F01N 3/0814
(Continued)

*Primary Examiner* — Timothy Vanoy
(74) *Attorney, Agent, or Firm* — Studebaker & Brackett PC (57) ABSTRACT

Provided is a system where a composite catalyst into which an LNT catalyst and an oxidation catalyst are combined, a catalyzed particulate filter, an injector configured to inject a urea water solution into an exhaust gas passage, and an SCR catalyst are arranged in this order in an upstream-to-downstream direction of the flow of the exhaust gas.

8 Claims, 4 Drawing Sheets

(51) Int. Cl.
  *F01N 3/035* (2006.01)
  *F01N 3/08* (2006.01)
  *F01N 3/10* (2006.01)
  *F01N 3/20* (2006.01)
  *F01N 13/00* (2010.01)

(52) U.S. Cl.
  CPC .. *B01D 2255/2092* (2013.01); *B01D 2255/50* (2013.01); *B01D 2255/908* (2013.01); *B01D 2255/9022* (2013.01); *B01D 2255/9032* (2013.01); *B01D 2255/912* (2013.01); *B01D 2258/012* (2013.01); *F01N 2510/0684* (2013.01); *F01N 2570/18* (2013.01); *F01N 2610/02* (2013.01)

(56) References Cited

U.S. PATENT DOCUMENTS

| | | | |
|---|---|---|---|
| 7,498,010 B2 | 3/2009 | Andreasson et al. | |
| 7,861,517 B2* | 1/2011 | Goulette | F01N 3/0231 60/279 |
| 8,142,747 B2 | 3/2012 | Andreasson et al. | |
| 8,480,986 B2 | 7/2013 | Andreasson et al. | |
| 9,302,224 B2* | 4/2016 | Andreasson | F01N 3/2066 |
| 2004/0258594 A1 | 12/2004 | Andreasson et al. | |
| 2006/0153761 A1 | 7/2006 | Bandl-Konrad et al. | |
| 2007/0175208 A1 | 8/2007 | Bandl-Konrad et al. | |
| 2007/0240402 A1 | 10/2007 | Andreasson et al. | |
| 2007/0277507 A1* | 12/2007 | Yan | B01D 53/9418 60/286 |
| 2009/0169451 A1 | 7/2009 | Andreasson et al. | |
| 2009/0193796 A1* | 8/2009 | Wei | F01N 13/009 60/297 |
| 2010/0199646 A1 | 8/2010 | Andreasson et al. | |
| 2010/0236224 A1* | 9/2010 | Kumar | B01D 53/9477 60/297 |
| 2010/0242448 A1* | 9/2010 | Mital | F01N 3/033 60/286 |
| 2011/0005204 A1 | 1/2011 | Bandl-Konrad et al. | |
| 2011/0173950 A1* | 7/2011 | Wan | F01N 3/10 60/274 |
| 2011/0179777 A1* | 7/2011 | Chandler | F01N 3/0222 60/297 |
| 2011/0286903 A1 | 11/2011 | Andreasson et al. | |
| 2013/0011313 A1 | 1/2013 | Bandl-Konrad et al. | |
| 2013/0065754 A1 | 3/2013 | Shinmyo et al. | |
| 2013/0186064 A1* | 7/2013 | Mehta | F01N 3/0871 60/274 |
| 2014/0047819 A1* | 2/2014 | Wan | B01D 53/9472 60/274 |
| 2015/0226100 A1 | 8/2015 | Bandl-Konrad et al. | |
| 2016/0047286 A1* | 2/2016 | Swallow | F01N 3/2066 60/274 |

FOREIGN PATENT DOCUMENTS

| | | | |
|---|---|---|---|
| JP | 09-053442 | 2/1997 | |
| JP | 2002-188429 A | 7/2002 | |
| JP | 2006-512529 A | 4/2006 | |
| JP | 2010-209737 A | 9/2010 | |
| JP | 2010-229929 A | 10/2010 | |
| JP | 2011-089521 A | 5/2011 | |
| KR | 101621983 B1 * | 5/2016 | ......... B01D 53/9445 |
| WO | 2011/118047 A1 | 9/2011 | |

* cited by examiner

EXHAUST GAS PURIFICATION SYSTEM AND EXHAUST GAS PURIFICATION METHOD

CROSS-REFERENCE TO RELATED APPLICATION

This application claims priority to Japanese Patent Application No. 2014-225375 filed on Nov. 5, 2014, the entire disclosure of which is incorporated by reference herein.

BACKGROUND

The present invention relates to an exhaust gas purification system and an exhaust gas purification method for an engine.

Exhaust gas from diesel engines or lean-burn gasoline engines contains nitrogen oxides (NOx) and particulates. Japanese Unexamined Patent Publication No. 2011-89521 discloses a system for treating NOx and particulates. This system makes exhaust gas pass through an oxidation catalyst, a particulate filter, a source of a reducing agent, a selective catalytic reduction (SCR) catalyst, and an $NH_3$ oxidation catalyst, in this order. In this system, the oxidation catalyst oxidizes NO in the exhaust gas and thereby produces $NO_2$, and the particulates on the filter are combusted in the presence of the produced $NO_2$, thereby reconditioning the filter. As the reducing agent, $NH_3$ or urea is supplied to an exhaust gas passage, and the SCR catalyst selectively reduces and purifies the NOx. $NH_3$ and/or derivatives thereof that have/has passed through the SCR catalyst are/is removed by the $NH_3$ oxidation catalyst.

Japanese Unexamined Patent Publication No. H09-53442 discloses a system in which exhaust gas is made to pass through an oxidation catalyst, a particulate filter, and a NOx trap catalyst, in this order. In this system, like the system of Japanese Unexamined Patent Publication No. 2011-89521, the oxidation catalyst oxidizes NO in the exhaust gas and thereby produces $NO_2$, and the particulates collected by the filter are combusted in the presence of the produced $NO_2$. NO produced through the reaction of the $NO_2$ and the particulates and $NO_2$ that has passed through the filter without reacting with the particulates are trapped by the NOx trap catalyst. The trapped NOx is released by cyclically richening the air-fuel ratio of the exhaust gas by fuel injection in exhaust strokes. The released NOx is then reduced and purified.

Japanese Unexamined Patent Publication No. H09-53442 also discloses a system which includes a NOx selective reduction catalyst, instead of a NOx trap catalyst. In this system, the air-fuel ratio of the exhaust gas is cyclically richened by fuel injection in exhaust strokes so as to increase the amounts of hydrocarbon (HC) and CO in the exhaust gas. The HC and other substances are accumulated in the NOx selective reduction catalyst (SCR catalyst), and NO and $NO_2$ are reduced and purified downstream from the filter by using the accumulated HC.

In each of the systems of the above patent publications, since the particulates are combusted by using the $NO_2$ produced by the oxidation catalyst, the filter is reconditioned at a relatively low temperature. This allows for reducing or omitting post injection which is performed to raise the temperature of the filter. (The post injection is to inject fuel into the combustion chamber of an engine in expansion strokes or exhaust strokes. The post injection increases the amounts of HC and CO in exhaust gas, and heat of oxidation reaction of the HC and CO in an oxidation catalyst raises the temperature of the exhaust gas.)

As can be seen from the foregoing, according to the known systems, the use of $NO_2$, while preventing the reconditioning of the filter from lowering the fuel efficiency of the engine, causes an increase in the amount of NOx which should be reduced and purified by the SCR catalyst and the NOx trap catalyst that are arranged downstream from the filter. Therefore, according to the system of Japanese Unexamined Patent Publication No. 2011-89521, it is necessary to increase the capacity of its reducing agent tank so as to supply the SCR catalyst with a sufficient amount of the reducing agent ($NH_3$ or urea). However, in a compact car, for example, it is difficult to ensure a space where a reducing agent tank having such a large capacity can be installed. Further, if an increased amount of the reducing agent is used, the amount of $NH_3$ passing through the SCR catalyst increases, and a heavier load is placed on the $NH_3$ oxidation catalyst that treats $NH_3$. The system of Japanese Unexamined Patent Publication No. H09-53442, in which HC is used as a reducing agent for the SCR catalyst, does not need a reducing agent tank. According to this system, however, it is necessary to frequently bring the air-fuel ratio of the exhaust gas into a condition close to rich, and therefore, fuel efficiency is lowered due to the reduction of NOx. Even if a NOx trap catalyst is used, instead of the SCR catalyst, to reduce NOx, it is necessary to frequently richen the air-fuel ratio of the exhaust gas. Thus, in this case, the fuel efficiency is also lowered.

SUMMARY

It is therefore an object of the present invention to efficiently treat NOx and particulates contained in exhaust gas.

To achieve the object, the present invention provides a system in which a NOx trap catalyst, i.e., a lean NOx trap (LNT) catalyst and an SCR catalyst are used in parallel, and the LNT catalyst and an oxidation catalyst are combined together.

The exhaust gas purification system disclosed herein is a system capable of treating NOx and particulates contained in exhaust gas from an engine. The system includes:

a composite catalyst into which an LNT catalyst which temporarily traps the NOx and reduces the NOx and an oxidation catalyst which oxidizes HC, CO and NO contained in the exhaust gas are combined;

a catalyzed filter including a filter which collects the particulates and on which a catalyst for combusting the particulates is loaded;

an SCR catalyst which selectively reduces the NOx in the presence of a reducing agent; and an injector which injects the reducing agent or a precursor of the reducing agent into an exhaust gas passage of the engine so as to supply the reducing agent to the SCR catalyst, wherein the composite catalyst, the catalyzed filter, the injector, and the SCR catalyst are arranged in the exhaust gas passage in this order in an upstream-to-downstream direction of a flow of the exhaust gas.

An exhaust gas purification method disclosed herein is a method for treating NOx and particulates contained in exhaust gas from an engine. The method includes:

trapping, by an LNT catalyst, $NO_2$ which has been produced through oxidation of NO by an oxidation catalyst combined and integral with the LNT catalyst, if an air-fuel ratio of the exhaust gas is lean;

collecting, by a catalyzed filter on which a catalyst is loaded, the particulates contained in the exhaust gas that has passed through the LNT catalyst if the air-fuel ratio of the exhaust gas is lean;

reducing and purifying NOx trapped by the LNT catalyst by performing a rich purge, which temporarily changes the air-fuel ratio of the exhaust gas from lean to rich, if an amount of the NOx trapped by the LNT catalyst reaches a predetermined value;

injecting a reducing agent or a precursor of the reducing agent into the exhaust gas if a temperature of the exhaust gas that has passed through the catalyzed filter is equal to or higher than a predetermined value;

reducing and purifying the NOx contained in the exhaust gas by an SCR catalyst in the presence of the reducing agent, increasing amounts of HC and CO in the exhaust gas by performing post injection, by which fuel is injected into a combustion chamber of the engine in an expansion or exhaust stroke, if an amount of the particulates collected on the catalyzed filter reaches a predetermined value; and combusting and removing the particulates collected on the catalyzed filter by the loaded catalyst, by raising a temperature of the catalyzed filter by making the exhaust gas whose temperature has been risen by heat of oxidation reaction of the HC and the CO by the oxidation catalyst flow into the filter.

Thus, if the air-fuel ratio of the exhaust gas is lean, the NOx in the exhaust gas is trapped by the LNT catalyst. The oxidation catalyst that is combined with the LNT catalyst oxidizes NO, which constitutes a large portion of the NOx in the exhaust gas, to $NO_2$. Therefore, NOx is efficiently trapped by the LNT catalyst. At this time, since the SCR catalyst does not need to purify NOx, it is unnecessary to inject the reducing agent or the precursor of the reducing agent. Alternatively, since a small amount of the NOx reaches the SCR catalyst, the required amount of the reducing agent or the precursor of the reducing agent to be injected is small even if the SCR catalyst need to purify the NOx.

When the amount of the NOx trapped by the LNT catalyst reaches a predetermined value, the NOx is released from the LNT catalyst by performing a rich purge, and the released NOx can be reduced and purified by the LNT catalyst. Also at this time, the SCR catalyst does not need to purify the NOx. Alternatively, even if part of the NOx released from the LNT catalyst flows downstream without being purified, and passes through the catalyzed filter to reach the SCR catalyst, the amount of this NOx is small. Therefore, even if the SCR catalyst needs to purify the NOx, the required amount of the reducing agent or the precursor of the reducing agent precursor is small.

On the other hand, if the SCR catalyst has a temperature which has been risen enough to activate the SCR catalyst itself, injection of the reducing agent or the precursor of the reducing agent enables the SCR catalyst to purify the NOx in the exhaust gas. Therefore, in this situation, even if the amount of the NOx trapped by the LNT catalyst that is provided upstream reaches a predetermined value, the rich purge does not necessarily have to be performed. In other words, if the SCR catalyst has a temperature which has been risen enough to activate the SCR catalyst itself, this SCR catalyst is allowed to purify the NOx, and the intervals between the rich purges for the LNT catalyst is increased, thereby avoiding lowering of the fuel efficiency which can be caused by the rich purges.

In this manner, the parallel use of the LNT catalyst and the SCR catalyst according to the present invention allows for reducing the lowering of fuel efficiency without deteriorating the NOx purification performance.

In a state where the air-fuel ratio of the exhaust gas is lean, the particulates in the exhaust gas are collected by the catalyzed filter. If the amount of the collected particulates reaches a predetermined value, the post injection is performed. The heat of oxidation reaction generated by the oxidation catalyst is utilized to raise the temperature of the exhaust gas, thereby raising the temperature of the catalyzed filter. As a result, the particulates collected on the catalyzed filter are combusted (reconditioning of the filter). At this time, $NO_2$ that has been produced through oxidation of NO in the oxidation catalyst arranged upstream serves as an oxidant to promote the combustion of the particulates. In addition, heat of oxidation reaction in the oxidation catalyst raises the temperature of the LNT catalyst, and consequently, $NO_2$ is released from the LNT catalyst. This released $NO_2$ also serves as an oxidant to promote the combustion of the particulates.

As can be seen from the foregoing, the $NO_2$ produced in the oxidation catalyst and the $NO_2$ released from the LNT catalyst are used for the combustion of the particulates. This allows for reducing the amount of the post injection, and accordingly, avoiding lowering of the fuel efficiency.

In addition, according to the present invention, the LNT catalyst and the oxidation catalyst are combined together into the composite catalyst, which advantageously prevents the system from increasing in size. This configuration also leads to a decrease in the amount of NOx that the SCR catalyst needs to purify, which allows for downsizing the SCR catalyst and the storage tank of the reducing agent or the precursor of the reducing agent.

In a preferred embodiment of the present invention, the injector injects $NH_3$ as the reducing agent or urea as the precursor of the reducing agent into the exhaust gas passage. Further, the system includes an oxidation catalyst which oxidizes $NH_3$ and/or derivatives thereof is arranged downstream from the SCR catalyst in the exhaust gas passage.

The urea injected in the exhaust gas passage is pyrolyzed or hydrolyzed to produce $NH_3$ that serves as the reducing agent. Part of $NH_3$ and/or the derivatives thereof that has not been consumed to purify NOx in the SCR catalyst and has passed through the SCR catalyst without reacting is oxidized by the oxidation catalyst that is arranged downstream of the SCR catalyst. In this manner, a stench which can be produced by the $NH_3$ and/or the derivatives thereof is prevented.

In a preferred embodiment of the present invention, the LNT catalyst of the composite catalyst includes a catalyst component which oxidizes NO contained in the exhaust gas, a NOx trap material which traps NOx contained in the exhaust gas, and a catalyst component which reduces the NOx trapped by the NOx trap material, the oxidation catalyst of the composite catalyst includes an HC trap material which traps HC contained in the exhaust gas, and a catalyst component which oxidizes HC, CO, and NO, and the composite catalyst has at least one of the following structure A, B or C:

Structure A: Each cell through which the exhaust gas passes has a cell wall made of a honeycomb carrier. A layer including the LNT catalyst and a layer including the oxidation catalyst are formed over the cell wall. One of the layers is provided closer to a space of the cell where the exhaust gas passes than the other is. Hereinafter, for the sake of convenience, the catalyst layer provided closer the space is referred to as the "upper layer" and the other catalyst layer is referred to as the "lower layer."

Structure B: Each cell through which the exhaust gas passes has a cell wall made of a honeycomb carrier. A catalytic layer of a mixture of the LNT catalyst and the oxidation catalyst is formed on the cell wall.

Structure C: Each cell through which the exhaust gas passes has a cell wall made of a honeycomb carrier. The LNT catalyst and the oxidation catalyst are provided on the cell wall such that the one of these catalysts is arranged upstream from the other with respect to the direction in which the exhaust gas flows through the cell.

Since the LNT catalyst includes the catalyst component that oxidizes NO, NO in the exhaust gas is oxidized to $NO_2$, and trapping of NOx by the NOx trap material is promoted. Further, since the oxidation catalyst includes the HC trap material, in a state where the temperature of the exhaust gas is low (i.e., in a state where the catalyst is not activated), the HC in the exhaust gas is kept trapped, and when the temperature of the exhaust gas has risen (i.e., when the catalyst is activated), the HC released from the HC trap material is oxidized and purified. This allows for reducing the amount of the HC which is discharged without being oxidized.

Regarding the structure A, if the LNT catalyst is provided as the upper layer and the oxidation catalyst is provided as the lower layer, the upper layer (the LNT catalyst) traps NOx, thereby preventing the NOx from inhibiting the oxidation of HC and CO by the lower layer (the oxidation catalyst). Further, the upper layer including the LNT catalyst has a high reduction capacity, the reaction by which NOx is reduced to $N_2$ easily progresses.

Regarding the structure A, if the LNT catalyst is provided as the lower layer and the oxidation catalyst is provided as the upper layer, the upper layer (the oxidation catalyst) oxidizes NO in the exhaust gas, and $NO_2$ is easily produced. Consequently, a NOx occlusion reaction by the lower layer (the LNT catalyst) easily progresses. Since the upper layer including the oxidation catalyst has a high oxidation capacity, the oxidation of components (HC, CO) of the post injection that is performed to recondition the catalyzed filter easily progresses, which is advantageous to rise of the temperature of the filter. Further, since $NO_2$ is produced in the upper layer (the oxidation catalyst), the ratio of $NO_2$ to the NOx flowing to the catalyzed filter is increased, which is advantageous to the reconditioning of the filter.

Regarding the structure B in which the LNT catalyst and the oxidation catalyst are mixed, the $NO_2$ produced by the oxidation catalyst is easily occluded by the NOx trapping material of the LNT catalyst.

Regarding the structure C, if the LNT catalyst is arranged upstream, NOx is trapped upstream, which allows for preventing the NOx from inhibiting the oxidation reaction of HC and CO by the oxidation catalyst arranged downstream. In addition, since the LNT catalyst arranged upstream easily increases in temperature, purification of the NOx which is released in response to a rich purge easily progresses. In a state where the air-fuel ratio of the exhaust gas is lean, NO released from the LNT catalyst is oxidized to $NO_2$ by the oxidation catalyst that is arranged downstream. Consequently, the $NO_2$ ratio to NOx flowing to the catalyzed filter increases, which is advantageous to the reconditioning of the filter.

Regarding the structure C, if the oxidation catalyst is arranged upstream, the oxidation catalyst that is arranged upstream oxidizes NO in the exhaust gas, and $NO_2$ is easily produced, which result in that a NOx occlusion reaction easily progresses in the LNT catalyst. The oxidation catalyst that is arranged upstream easily increases in temperature, which makes oxidation reaction of HC and CO progress easy. This allows for quickly raising the temperature of the catalyzed filter, which is advantageous to the recondition of the filter.

In a preferred embodiment of the exhaust gas purification method, the method further includes: trapping the reducing agent and/or derivatives thereof contained in the exhaust gas that has passed through the SCR catalyst; and oxidizing the reducing agent and/or the derivatives if an amount of the trapped reducing agent and/or the trapped derivatives reach a predetermined value. This allows for preventing the reducing agent and/or the derivatives from slipping (from being discharged into the atmosphere).

DETAILED DESCRIPTION

Embodiments of the present invention will now be described with reference to the drawings. Note that the following description of preferred embodiments is merely illustrative in nature, and is not intended to limit the scope, applications, and use of the present disclosure.

<System Configuration>

Figure 1:
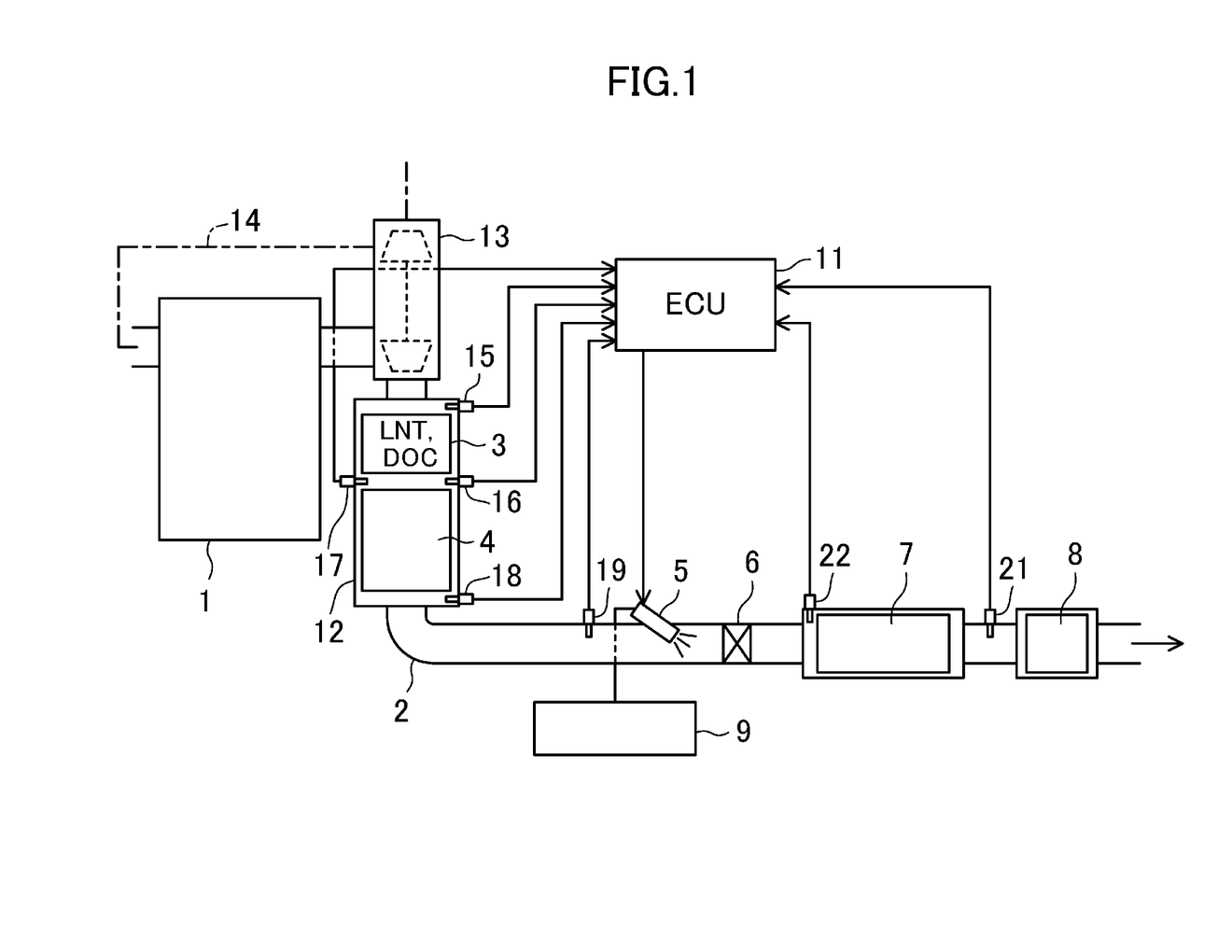
FIG. 1 shows a configuration of a system for purifying exhaust gas from an engine.

FIG. 1 shows an exhaust gas purification system which is capable of treating NOx and particulates (hereinafter referred to as the "PM") contained in exhaust gas from an engine 1. The engine 1 of this example is a diesel engine and has an exhaust gas passage 2 in which a composite catalyst 3, a catalyzed filter 4, an injector 5 for injecting a reducing agent or a precursor of the reducing agent, mixer 6, an SCR catalyst 7, and an $NH_3$ oxidation catalyst 8 are sequentially arranged in the upstream-to-downstream direction of the flow of the exhaust gas. In this specification, the terms "upstream" and "downstream" are used with respect to the direction in which the exhaust gas flows. This system further includes a tank 9 in which the reducing agent or the precursor of the reducing agent is stored, and various sensors. Based on signals from these sensors, an engine control unit (ECU) 11 performs control of fuel injection into the engine 1 and control of the injector 5.

The composite catalyst 3 includes an LNT catalyst and an oxidation catalyst (a DOC) that are combined together. The LNT catalyst temporarily traps NOx, and reduces and purifies NOx. The oxidation catalyst oxidizes HC, CO, and NO that are contained in the exhaust gas.

The LNT catalyst includes: a catalyst component which oxidizes NO contained in the exhaust gas; an NOx trap material which traps NOx in the exhaust gas when the air-fuel ratio of the exhaust gas is lean and which releases NOx when the air-fuel ratio of the exhaust gas is equal to a theoretical air-fuel ratio or becomes rich; and a catalyst component which reduces the NOx trapped by the NOx trap material. For example, the NO oxidation catalyst component is preferably configured as a catalyst made of a mixture which is comprised of activated alumina and a Ce-containing oxide as an oxygen storage capacity (OSC) material and on which Pt is loaded. The NOx trap material is preferably configured as a compound of an alkaline-earth metal such as Ba. The NOx reduction catalyst component is preferably configured as a catalyst made of a mixture which is comprised of activated alumina and an OSC material (a Ce-containing oxide) and on which Rh is loaded.

As a material for the NOx trap material, an alkaline-earth metal acetate is used. This alkaline-earth metal acetate is loaded on a carrier, calcined, and converted into a carbonate. Thus, this alkaline-earth metal carbonate serves as the NOx trap material.

The oxidation catalyst includes an HC trap material which traps HC contained in the exhaust gas, and a catalyst component which oxidizes the HC trapped by the HC trap material and HC, CO, and NO contained in the exhaust gas. For example, the HC trap material is preferably configured as zeolite, and the oxidation catalyst component is preferably configured as a catalyst made of a mixture which is comprised of activated alumina and an OSC material (a Ce-containing oxide) and on which Pt and/or Pd are/is loaded.

The composite catalyst 3 may have a configuration having at least one of the following structures A, B, and C.

Structure A: Each cell through which the exhaust gas passes has a cell wall made of a honeycomb carrier. A layer including the LNT catalyst and a layer including the oxidation catalyst are formed on the cell wall. One of these layers is provided as an upper layer which is closer than the other to a space of the cell where the exhaust gas passes.

Structure B: Each cell through which the exhaust gas passes has a cell wall made of a honeycomb carrier. A catalytic layer of a mixture of the LNT catalyst and the oxidation catalyst is formed on the cell wall.

Structure C: Each cell through which the exhaust gas passes has a cell wall made of a honeycomb carrier. Both the LNT catalyst and the oxidation catalyst are provided on the cell wall such that the one of these catalysts is arranged upstream from the other with respect to the direction in which the exhaust gas flows through the cell.

Figure 2:
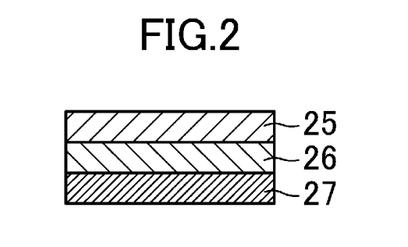
FIG. 2 is a cross-sectional view schematically showing, as an example, a preferred structure of a composite catalyst.

In the structure A, as shown in FIG. 2, both the oxidation catalyst 25 and the LNT catalyst 26 are preferably supported by the cell wall 27 such that the oxidation catalyst 25 forms the upper layer and the LNT catalyst 26 forms the lower layer.

Figure 3:
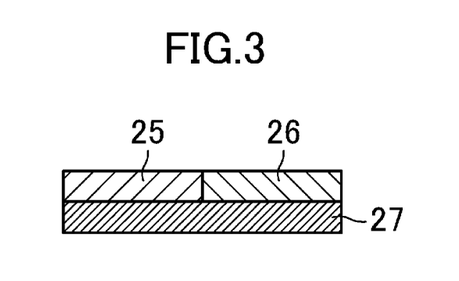
FIG. 3 is a cross-sectional view schematically showing, as an example, another preferred structure of the composite catalyst.

In the structure C, as shown in FIG. 3, both the oxidation catalyst 25 and the LNT catalyst 26 are supported by the cell wall 27 such that the oxidation catalyst 25 is arranged upstream from the LNT catalyst 26.

The catalyzed filter 4 is made of a filter which is configured to collect the PM and on which a PM combustion catalyst is loaded. The catalyst preferably includes, for example, activated alumina on which Pt and an alkaline-earth metal are loaded, a Ce-containing oxide on which Pt and an alkaline-earth metal are loaded, and a Zr-based complex oxide which contains no Ce and on which Pt and an alkaline-earth metal are loaded.

The SCR catalyst 7 selectively reduces and purifies the NOx in the presence of a reducing agent. In this example, a urea-SCR catalyst in which urea is used as the precursor of $NH_3$ that serves as the reducing agent is used as the SCR catalyst 7. Therefore, a urea water solution is stored in the tank 9. The SCR catalyst 7 is preferably configured as a catalyst component including zeolite which traps $NH_3$ and on which a catalytic metal that reduces NOx using $NH_3$ as a reducing agent is loaded. The SCR catalyst 7 preferably has a structure in which the catalyst component is supported on the cell wall of the honeycomb carrier. As the catalytic metal for NOx reduction, Fe, Ti, Ce, or W is preferably used, for example. It is not preferable to use a metal which tends to oxidize $NH_3$ to NOx, such as Pt and Pd.

It is preferable to add, to the SCR catalyst, at least one of a Ce-based complex oxide, a Zr-based complex oxide, or an alkaline-earth metal compound, as a weak oxidant. This addition of the weak oxidant enables oxidation of NO to $NO_2$ on the SCR catalyst 7. Thus, even in a low temperature state where the ratio of NO to the exhaust gas is high, the ratio between NO and $NO_2$, i.e., $NO_2/NO$, can be made close to 1 on the SCR catalyst 7. This allows for increasing the NOx purification rate in a low temperature state. Further, the use of the Ce-based complex oxide, the Zr-based complex oxide, and the alkaline-earth metal compound, which are weak oxidants, allows for reducing the oxidation of the reducing agent ($NH_3$) that reduces NOx in the SCR catalyst 7, and consequently, reducing a decrease in the amount of $NH_3$.

The injector 5 may be configured as an injection valve which supplies the urea water solution in the tank 9 to a portion of the exhaust gas passage 2 between the composite catalyst 3 and the mixer 6. The mixer 6 is configured to diffuse the urea water solution in the exhaust gas within the exhaust gas passage 2.

The $NH_3$ oxidation catalyst 8 is configured to trap and oxidize $NH_3$ and the derivatives thereof that have passed (slipped) through the SCR catalyst 7 without reacting with NOx, and to prevent the $NH_3$ and the derivatives from slipping through the $NH_3$ oxidation catalyst 8. The $NH_3$ oxidation catalyst 8 preferably has a configuration where Pt-loaded zeolite, i.e., zeolite which traps $NH_3$ and on which Pt is loaded and a Pt-loaded OSC material are supported by a cell wall made of a honeycomb carrier.

The composite catalyst 3 and the catalyzed filter 4 are housed in a catalyst housing 12 and are in tandem with each other such that the former is positioned upstream with respect to the direction of the exhaust gas flow. This catalyst housing 12 is directly connected to the exhaust gas outlet of a turbo supercharger 13 and arranged in the engine room of an automobile. The turbo supercharger 13 is directly connected to the downstream end of an exhaust manifold of the engine 1. This configuration makes the exhaust gas at relatively high temperature flow into the composite catalyst 3 and the catalyzed filter 4 even when the engine starts. In FIG. 1, reference character 14 denotes an intake air passage of the engine 1. On the other hand, the SCR catalyst 7 and the $NH_3$ oxidation catalyst 8 are arranged under the floor of the automobile.

Next, the various sensors that are arranged in the exhaust gas passage 2 are described. A first temperature sensor 15 configured to detect the temperature of the exhaust gas that is flowing into the composite catalyst 3 is disposed upstream from the composite catalyst 3. On conditions that the exhaust gas temperature detected by this first temperature sensor 15 is equal to or higher than a predetermined value and the amount of NOx trapped by the LNT catalyst has reached a predetermined value, a rich purge (which is temporarily changing an engine air-fuel ratio from lean to rich) is performed to make the LNT catalyst release the NOx trapped therein and to reduce and purify the NOx. The amount of the trapped NOx is estimated based on the engine operating history and the rich purge history. Here, the rich purge is performed by increasing the amount of fuel injected into the combustion chamber of the engine 1 in a compression stroke. Consequently, the air-fuel ratio of the exhaust gas flowing into the LNT catalyst is richened, and the NOx is released.

A second temperature sensor 16 configured to detect the temperature of the exhaust gas that is flowing into catalyzed filter 4 is disposed between the composite catalyst 3 and the catalyzed filter 4. Based on the exhaust gas temperature detected by this second temperature sensor 16, the amount of post injection for reconditioning the catalyzed filter 4 is controlled. Specifically, the amount of post injection is controlled such that the exhaust gas temperature becomes equal to a preset temperature so as to ensure that the temperature of the catalyzed filter 4 rises to reach the ignition temperature of the PM.

Pressure sensors 17 and 18 are respectively disposed upstream and downstream from the catalyzed filter 4. The sensors 17 and 18 are configured to detect a pressure difference $\Delta$ in the exhaust gas between portions upstream and downstream from the catalyzed filter 4. In this example, the upstream pressure sensor 17 is disposed between the composite catalyst 3 and the catalyzed filter 4. Based on the pressure difference $\Delta$, the amount of the PM collected by the catalyzed filter 4 is calculated. If the amount of the collect PM reaches a predetermined value, the post injection is performed at predetermined timing of injection.

An upstream NOx sensor 19 configured to detect the NOx concentration of the exhaust gas that is flowing into the SCR catalyst 7 is disposed between the catalyzed filter 4 and the mixer 6. A downstream NOx sensor 21 configured to detect the NOx concentration of the exhaust gas that is flowing out of the SCR catalyst 7 is disposed between the SCR catalyst 7 and the $NH_3$ oxidation catalyst 8. Further, a third temperature sensor 22 configure to detect the temperature of the exhaust gas that is flowing into the SCR catalyst 7 is disposed immediately upstream from the SCR catalyst 7.

On conditions that the NOx concentration detected by the upstream NOx sensor 19 is equal to or higher than a predetermined value and the exhaust gas temperature detected by the third temperature sensor 22 is equal to or higher than a predetermined value, the injector 5 injects the urea water solution to allow the SCR catalyst 7 to purify the NOx. The amount of the urea water solution to be injected is controlled to an appropriate amount based on the amount of $NH_3$ absorbed by the zeolite of the SCR catalyst 7 and the NOx concentration detected by the upstream NOx sensor 19. The amount of $NH_3$ absorbed by the zeolite is estimated based on the NOx concentrations detected by the upstream and downstream NOx sensors 19 and 21 and the history of the amount of the injected urea water solution.

In addition to the foregoing sensors, the exhaust gas passage 2 is provided with a sensor (not shown) configured to detect the air-fuel ratio of the exhaust gas. The air-fuel ratio of the exhaust gas may be estimated based on the operation state of the engine 1.

<Purification of Exhaust Gas>

[NOx Trap by LNT Catalyst and PM Collection by Catalyzed Filter 4]

Figure 4:
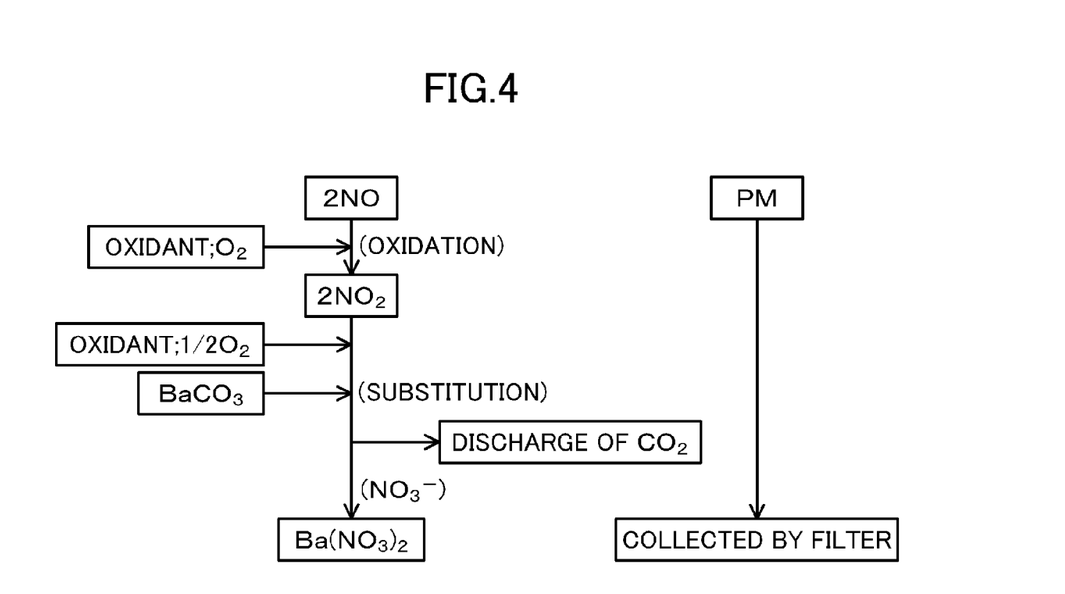
FIG. 4 is a block diagram for explaining a NOx trap and PM collection.

When the air-fuel ratio of the exhaust gas is lean, as shown in FIG. 4, NOx in the exhaust gas (in FIG. 4, NO is representatively shown) is trapped by the NOx trap material of the LNT catalyst of the composite catalyst 3, while the PM is collected by the catalyzed filter 4.

The NO, which constitutes a large portion of the NOx in the exhaust gas, reacts with $O_2$ contained in the exhaust gas and oxidized to $NO_2$, in the presence of the oxidation catalyst and the NO oxidation catalyst component of the LNT catalyst. For example, if a Ba compound is used as the NOx trap material, $NO_2$ reacts with $BaCO_3$ in the presence of oxygen ($\frac{1}{2} O_2$) and gets trapped (a substitution reaction). Specifically, the $NO_2$ is converted into $NO_3^-$, which is then bonded to Ba. Consequently, $Ba(NO_3)_2$ is produced, while $CO_2$ is desorbed from $BaCO3$ and released.

[Release and Reduction of NOx by LNT Catalyst, and PM Collection by Catalyzed Filter 4]

Figure 5:
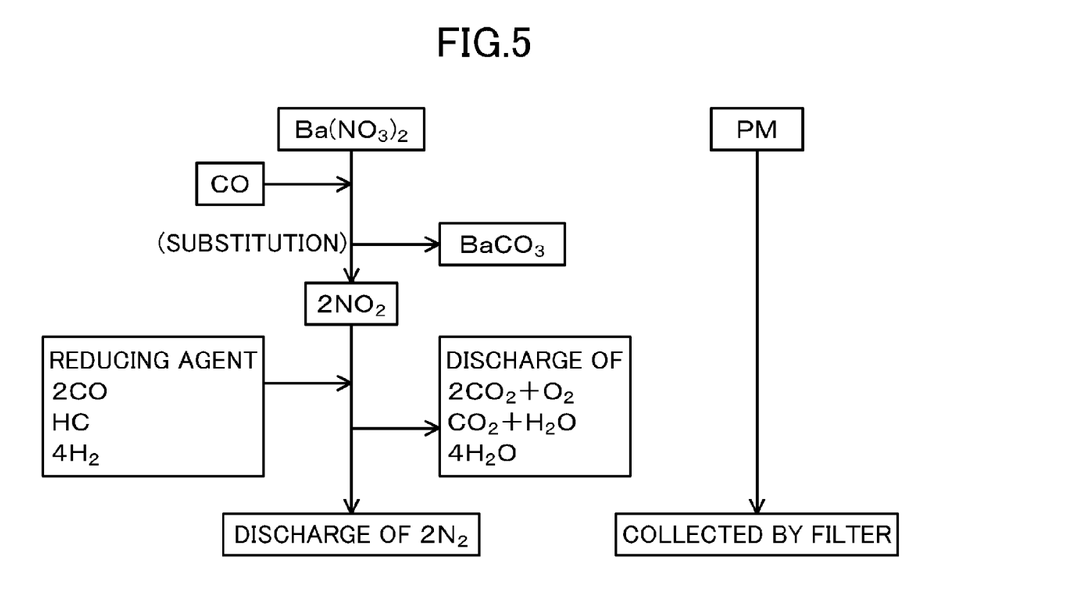
FIG. 5 is a block diagram for explaining release and reduction of NOx and PM collection.

On conditions that the amount of NOx trapped by the NOx trap material is equal to or larger than the predetermined value and the temperature of the exhaust gas flowing into the composite catalyst 3 is equal to or higher than the predetermined value (for example, 200° C.), the rich purge is performed as necessary. Consequently, the air-fuel ratio of the exhaust is richened temporarily, and NOx is released from the NOx trap material, and then, reduced and purified by the NOx reduction catalyst, as shown in FIG. 5. In this manner, the NOx trapping capacity of the NOx trap material is recovered (reconditioning of LNT catalyst). The catalyzed filter 4 continues collecting PM also during this process.

Next, the release and reduction of NOx are described. As shown in FIG. 5, $Ba(NO_3)_2$ is converted, through the reaction (substitution reaction) with CO which increases in the exhaust gas due to the above rich purge, into $BaCO_3$, and consequently, $NO_2$ is desorbed and released. This $NO_2$ reacts with the reducing agents (CO, HC, and $H_2$) contained in the exhaust gas in the presence of the NOx reduction catalyst, and is converted into $N_2$ to be discharged. As a result of this reduction reaction, $CO_2$, $O_2$, and $H_2O$ are also produced and discharged.

[PM Combustion by Catalyzed Filter 4]

In a state where the air-fuel ratio of the exhaust gas is lean, if the amount of the PM collected by the catalyzed filter 4 is determined to have reached the predetermined value based on the pressure difference $\Delta$ in the exhaust gas between the potions upstream and downstream from the catalyzed filter 4, the post injection is performed based on the temperature of the exhaust gas that is flowing into the catalyzed filter 4. In this manner, the PM collected on the catalyzed filter 4 are combusted and removed, and the PM collecting capacity of the filter is recovered (reconditioning of the filter). This process is specifically described below.

Figure 6:
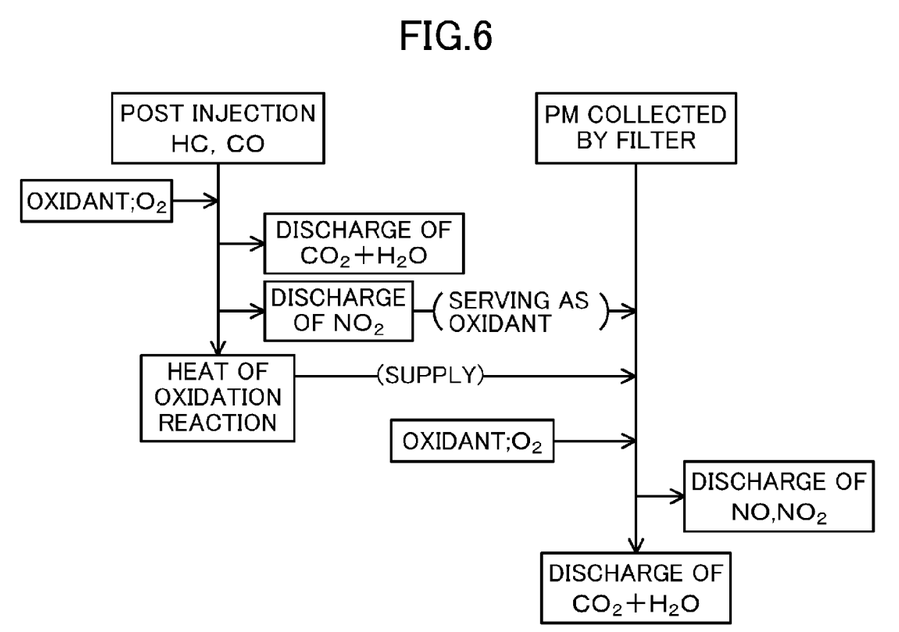
FIG. 6 is a block diagram for explaining reconditioning of a filter.

As shown in FIG. 6, the post injection causes an increase in HC and CO in the exhaust gas from the engine 1. The HC and CO react with oxygen ($O_2$) contained in the exhaust gas in the presence of the oxidation catalyst of the composite catalyst 3, and consequently, $CO_2$ and $H_2O$ are produced and discharged. At this time, heat of oxidation reaction is generated to raise the temperature of the exhaust gas that is flowing into the catalyzed filter 4. As a result, the temperature of the catalyzed filter 4 rises to improve the PM combustion rate significantly.

In addition, the oxidation catalyst of the composite catalyst 3 and the NO oxidation catalyst of the LNT catalyst make the NO in the exhaust gas react with oxygen ($O_2$) in the exhaust gas, thereby producing $NO_2$. This $NO_2$ and the oxygen ($O_2$) in the exhaust gas are supplied, as oxidants, to the catalyzed filter 4. Alternatively, the heat of oxidation reaction raises the temperature of the LNT catalyst, and $NO_2$ is released from the NOx trap material, and then supplied to the catalyzed filter 4. In the catalyzed filter 4, the collected PM react with oxygen or $NO_2$ (the PM combustion) in the presence of the catalyst, and the PM are converted into $CO_2$ and then discharged. Further, NO produced through the reaction of $NO_2$ and the PM as well as $NO_2$ that has not reacted are discharged from the catalyzed filter 4.

Thus, the $NO_2$ supplied from the oxidation catalyst and the LNT catalyst to the catalyzed filter 4 serves as an oxidant to promote the combustion of the PM, which reduces the amount of post injection that is performed to combust the PM.

[Selective Reduction of NOx by SCR Catalyst 7]

Figure 7:
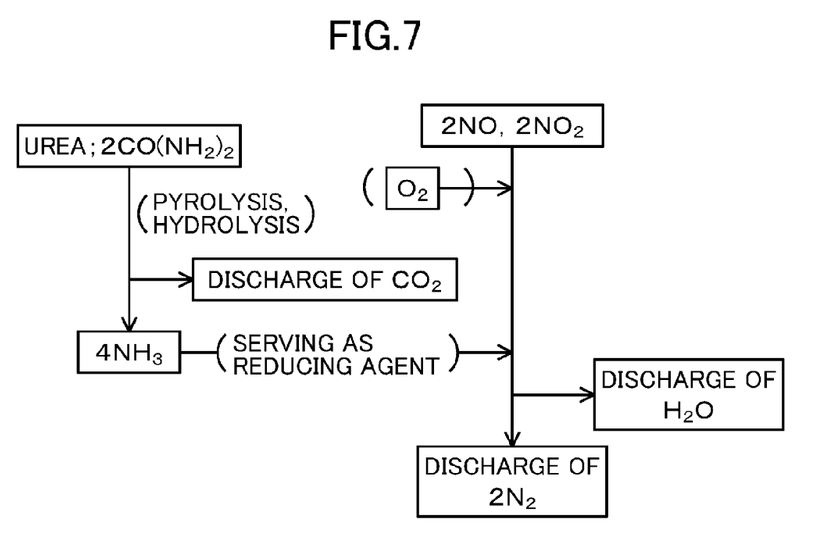
FIG. 7 is a block diagram for explaining reduction of NOx by an SCR catalyst.

NOx that has not been trapped by the LNT catalyst, NOx that has not been reduced and purified by the LNT catalyst, or NOx discharged from the catalyzed filter 4 flows toward the SCR catalyst 7. On conditions that the NOx concentration of the exhaust gas that is flowing into the SCR catalyst 7 is equal to or higher than the predetermined value and the temperature of the exhaust gas that is flowing into the SCR catalyst 7 is equal to or higher than the predetermined value (for example, 200° C.), the SCR catalyst 7 carries out selective reduction of NOx as necessary.

For example, if a rich purge has made the LNT catalyst release NOx and reduce and purify the NOx, part of the released NOx may be discharged without being reduced and purified, and consequently, the NOx concentration of the exhaust gas flowing into the SCR catalyst 7 may become equal to or higher than the predetermined value. In such a case, on condition that the temperature of the exhaust gas flowing into the SCR catalyst 7 is equal to or higher than the predetermined value, the injector 5 injects the urea water solution in order that the SCR catalyst 7 performs selective reduction of NOx.

As shown in FIG. 7, as a result of the injection of the urea water solution by the injector 5 into the exhaust gas passage 2, the urea is pyrolyzed and hydrolyzed to produce $NH_3$ (the reducing agent), and this $NH_3$ is absorbed by the zeolite of the SCR catalyst 7. Further, $CO_2$ produced due to decomposition of the urea is discharged. NOx (NO and $NO_2$) that has entered the SCR catalyst 7 is reduced and purified by the $NH_3$ absorbed by the zeolite and converted into $N_2$. The $N_2$ is discharged together with $H_2O$ that is produced at the same time as the reduction and purification of the NOx.

Here, $NH_3$ reduces NOx through the reactions represented by the following formulas. As can be seen from the formulas, $O_2$ contained in exhaust gas participates in some of the reactions, and is not involved in the others.

(Reactions in which $O_2$ Participates)

$$4NO+4NH_3+O_2 \rightarrow 4N_2+6H_2O$$

$$2NO_2+4NH_3+O_2 \rightarrow 3N_2+6H_2O$$

(Reactions in which $O_2$ does not Participate)

$$NO+NO_2+2NH_3 \rightarrow 2N_2+3H_2O$$

$$6NO_2+8NH_3 \rightarrow 7N_2+12H_2O$$

[Oxidation of $NH_3$ and Other Substances by $NH_3$ Oxidation Catalyst 8]

$NH_3$ and the derivatives thereof that have passed through the SCR catalyst 7 without reacting with NOx are trapped by the zeolite of the $NH_3$ oxidation catalyst 8, which prevents $NH_3$ and the derivatives from being discharged into the atmosphere. The $NH_3$ and the derivatives trapped by the zeolite are desorbed from the zeolite when the amount of the trapped $NH_3$ and the derivatives reaches a predetermined value. The desorbed $NH_3$ and derivatives are then oxidized by a Pt catalyst, and discharged. This process is specifically described below.

The amount of the trapped $NH_3$ and derivatives are determined in the following manner. To the value detected by the downstream NOx sensor 21, not only the amount of NOx that has left the SCR catalyst 7 but also the amount of $NH_3$ that has left the SCR catalyst 7 are reflected. With the utilization of this, the amount of the $NH_3$ and the derivatives thereof that have slipped through the SCR catalyst 7 and trapped by the $NH_3$ oxidation catalyst 8 is determined based on the value detected by the upstream NOx sensor 19 (from which the amount of NOx that enters the SCR catalyst 7 is determined), the amount of the urea water solution injected by the injector 5 (from which the amount of $NH_3$ that enters the SCR catalyst 7 is determined), and the value detected by the downstream NOx sensor 21 (from which the total amount of NOx and $NH_3$ that have left the SCR catalyst 7 is determined). Summation of the thus determined amounts gives the amount of the trapped $NH_3$ and derivatives.

When the amount of the trapped $NH_3$ and derivatives reaches the predetermined value, the post injection is performed. As a result, the exhaust gas temperature raises, the $NH_3$ and the derivatives are desorbed from the zeolite, and then, oxidized by the Pt catalyst.

Meanwhile, also when the catalyzed filter 4 is reconditioned, the exhaust gas temperature raises, and the $NH_3$ and the derivatives are desorbed from the zeolite, and then, oxidized by the Pt catalyst. Further, when the engine is operating under heavy load, the exhaust gas temperature raises. Also in this situation, the $NH_3$ and the derivatives may be desorbed from the zeolite, and then, oxidized by the Pt catalyst.

However, the engine is made to operate under heavy load not in dependence on the amount of the trapped $NH_3$ and derivatives. In addition, if the post injection is performed or if the catalyzed filter 4 is reconditioned to oxidize and remove the $NH_3$ and derivatives trapped by the $NH_3$ oxidation catalyst 8, the fuel efficiency will be lowered.

Therefore, according to a preferred embodiment, the trapping capacity (i.e., the amount of zeolite) of the $NH_3$ oxidation catalyst 8 is set such that the $NH_3$ oxidation catalyst 8 is substantially saturated with an estimated amount of the $NH_3$ and the derivatives thereof which can slip through the SCR catalyst 7 during an interval between the reconditioning of the filter.

This preferred embodiment allows for oxidizing and removing the $NH_3$ and derivatives trapped by the $NH_3$ oxidation catalyst 8 by using heat generated when the catalyzed filter 4 is reconditioned. This preferred embodiment also allows for preventing the $NH_3$ and the derivatives from slipping through the $NH_3$ oxidation catalyst 8 to be discharged into the atmosphere.

[Relationship Between LNT Catalyst and SCR Catalyst 7]

If the amount of the NOx trapped by the LNT catalyst of the composite catalyst 3 is still small, and the LNT catalyst continues occluding the NOx contained in the exhaust gas, the NOx concentration detected by the upstream NOx sensor 19 is normally lower than the predetermined value. Therefore, in this situation, the SCR catalyst 7 does not need to purify NOx, and thus, the injector 5 does not need to inject the urea water solution. Alternatively, since a small amount of NOx enters the SCR catalyst 7, the NOx can be reduced and purified only by injecting a slight amount of the urea water solution.

As the amount of the NOx trapped by the LNT catalyst increases, the NOx trapping rate of the LNT catalyst is slowed, and consequently, the NOx concentration of the exhaust gas that is flowing into the SCR catalyst 7 increases. If the amount of the NOx trapped by the LNT catalyst is equal to or larger than the predetermined value and the NOx concentration and temperature of the exhaust gas that is flowing into the SCR catalyst 7 are equal to or higher than the respective predetermined values, the recovery of the NOx trapping capacity (reconditioning of the LNT catalyst) or the selective reduction of NOx by the SCR catalyst by the injection of the urea water solution can be implemented selectively. The recovery of the NOx trapping capacity and the selective reduction of NOx may be implemented in parallel.

The injection of the urea water solution makes the SCR catalyst 7 reduce and purify NOx. Therefore, the rich purge does not necessarily have to be performed only because the amount of the NOx trapped by the LNT catalyst has reached the predetermined value. For example, the intervals between the rich purges may be increased to enable reduction of fuel consumption. On the other hand, when the rich purge makes the LNT catalyst release NOx, since the NOx is converted by the reduction catalyst into $N_2$, the selective reduction of NOx by the SCR catalyst 7 is unnecessary. Alternatively, since a small amount of NOx enters the SCR catalyst 7, the required amount of the urea water solution to be injected is small. Alternatively, if a small amount of the urea water solution is left in the tank 9, the reconditioning of the LNT catalyst by the rich purge is performed in preference to the reduction and purification of NOx by the SCR catalyst 7, thereby reducing the amount of NOx to be discharged, and consequently, reducing the consumption of the urea water solution.

What is claimed is:

1. An exhaust gas purification system capable of treating NOx and particulates contained in exhaust gas from an engine, the system comprising:
   a composite catalyst into which an LNT catalyst which temporarily traps the NOx and reduces the NOx, and an oxidation catalyst which oxidizes HC, CO and NO contained in the exhaust gas are combined;
   a catalyzed filter including a filter which collects the particulates and on which a catalyst for combusting the particulates is loaded;
   an SCR catalyst which selectively reduces the NOx in the presence of a reducing agent; and
   an injector which injects the reducing agent or a precursor of the reducing agent into an exhaust gas passage of the engine so as to supply the reducing agent to the SCR catalyst, wherein
   the SCR catalyst contains, as a weak oxidant, at least one of a Ce-based complex oxide, a Zr-based complex oxide, or an alkaline-earth metal compound, and
   the composite catalyst, the catalyzed filter, the injector, and the SCR catalyst are arranged in the exhaust gas passage in this order in an upstream-to-downstream direction of a flow of the exhaust gas.

2. The system of claim 1, wherein
   the injector injects $NH_3$ as the reducing agent or urea as the precursor of the reducing agent into the exhaust gas passage, and
   the system further includes an oxidation catalyst which oxidizes $NH_3$ and/or derivatives thereof and which is arranged downstream from the SCR catalyst in the exhaust gas passage.

3. The system of claim 2, wherein
   the LNT catalyst of the composite catalyst includes a catalyst component which oxidizes NO contained in the exhaust gas, a NOx trap material which traps NOx contained in the exhaust gas, and a catalyst component which reduces the NOx trapped by the NOx trap material,
   the oxidation catalyst of the composite catalyst includes an HC trap material which traps HC contained in the exhaust gas, and a catalyst component which oxidizes HC, CO, and NO, and
   the composite catalyst has at least one structure selected from:
   a structure A where each cell through which the exhaust gas passes has a cell wall made of a honeycomb carrier, a layer including the LNT catalyst and a layer including the oxidation catalyst are formed over the cell wall, and one of the layers is provided closer to a space of the cell where the exhaust gas passes than the other is;
   a structure B where each cell through which the exhaust gas passes has a cell wall made of a honeycomb carrier, and a catalytic layer of a mixture of the LNT catalyst and the oxidation catalyst is formed on the cell wall; or
   a structure C where each cell through which the exhaust gas passes has a cell wall made of a honeycomb carrier, the LNT catalyst and the oxidation catalyst are provided on the cell wall such that the one of these catalysts is arranged upstream from the other with respect to a direction in which the exhaust gas flows through the cell.

4. An exhaust gas purification system capable of treating NOx and particulates contained in exhaust gas from an engine, the system comprising:
   a composite catalyst into which an LNT catalyst which temporarily traps the NOx and reduces the NOx, and an oxidation catalyst which oxidizes HC, CO and NO contained in the exhaust gas are combined;
   a catalyzed filter including a filter which collects the particulates and on which a catalyst for combusting the particulates is loaded;
   an SCR catalyst which selectively reduces the NOx in the presence of a reducing agent;
   and an injector which injects the reducing agent or a precursor of the reducing agent into an exhaust gas passage of the engine so as to supply the reducing agent to the SCR catalyst, wherein
   the composite catalyst, the catalyzed filter, the injector, and the SCR catalyst are arranged in the exhaust gas passage in this order in an upstream-to-downstream direction of a flow of the exhaust gas,
   the LNT catalyst of the composite catalyst includes a catalyst component which oxidizes NO contained in the exhaust gas, a NOx trap material which traps NOx contained in the exhaust gas, and a catalyst component which reduces the NOx trapped by the NOx trap material,
   the oxidation catalyst of the composite catalyst includes an HC trap material which traps HC contained in the exhaust gas, and a catalyst component which oxidizes HC, CO, and NO, and
   the composite catalyst has at least one of:
   a structure A where each cell through which the exhaust gas passes has a cell wall made of a honeycomb carrier, a layer including the LNT catalyst and a layer including the oxidation catalyst are formed over the cell wall, and the layer including the LNT catalyst is provided closer to a space of the cell where the exhaust gas passes than the other is; or
   a structure B where each cell through which the exhaust gas passes has a cell wall made of a honeycomb carrier, the LNT catalyst and the oxidation catalyst are provided on the cell wall such that the LNT catalyst is arranged upstream from the oxidation catalyst with respect to a direction in which the exhaust gas flows through the cell.

5. The system of claim 4, wherein
the injector injects $NH_3$ as the reducing agent or urea as the precursor of the reducing agent into the exhaust gas passage, and
the system further includes an oxidation catalyst which oxidizes $NH_3$ and/or derivatives thereof and which is arranged downstream from the SCR catalyst in the exhaust gas passage.

6. An exhaust gas purification method for treating NOx and particulates contained in exhaust gas from an engine, the method comprising:
trapping, by an LNT catalyst, $NO_2$ which has been produced through oxidation of NO by an oxidation catalyst combined and integral with the LNT catalyst, if an air-fuel ratio of the exhaust gas is lean;
collecting, by a catalyzed filter on which a catalyst is loaded, the particulates contained in the exhaust gas that has passed through the LNT catalyst if the air-fuel ratio of the exhaust gas is lean;
reducing and purifying NOx trapped by the LNT catalyst by performing a rich purge, which temporarily changes the air-fuel ratio of the exhaust gas from lean to rich, if an amount of the NOx trapped by the LNT catalyst reaches a predetermined value;
injecting a reducing agent or a precursor of the reducing agent into the exhaust gas if a temperature of the exhaust gas that has passed through the catalyzed filter is equal to or higher than a predetermined value;
reducing and purifying the NOx contained in the exhaust gas by an SCR catalyst in the presence of the reducing agent,
increasing amounts of HC and CO in the exhaust gas by performing post injection, by which fuel is injected into a combustion chamber of the engine in an expansion or exhaust stroke, if an amount of the particulates collected on the catalyzed filter reaches a predetermined value; and
combusting and removing the particulates collected on the catalyzed filter by the loaded catalyst, by raising a temperature of the catalyzed filter by making the exhaust gas, whose temperature has been risen by heat of oxidation reaction of the HC and the CO by the oxidation catalyst, flow into the filter, wherein a turbo supercharger is arranged between the engine and a composite catalyst into which the LNT catalyst and the oxidation catalyst are combined,
the turbo supercharger, the composite catalyst, and the catalyzed filter are arranged in an engine room,
the LNT catalyst of the composite catalyst includes a catalyst component which oxidizes NO contained in the exhaust gas, a NOx trap material which traps NOx contained in the exhaust gas, and a catalyst component which reduces the NOx trapped by the NOx trap material,
the oxidation catalyst of the composite catalyst includes an HC trap material which traps HC contained in the exhaust gas, and a catalyst component which oxidizes HC, CO, and NO, and
the composite catalyst has at least one structure selected from:
a structure A where each cell through which the exhaust gas passes has a cell wall made of a honeycomb carrier, a layer including the LNT catalyst and a layer including the oxidation catalyst are formed over the cell wall, and one of the layers is provided closer to a space of the cell where the exhaust gas passes than the other is;
a structure B where each cell through which the exhaust gas passes has a cell wall made of a honeycomb carrier, and a catalytic layer of a mixture of the LNT catalyst and the oxidation catalyst is formed on the cell wall; or
a structure C where each cell through which the exhaust gas passes has a cell wall made of a honeycomb carrier, the LNT catalyst and the oxidation catalyst are provided on the cell wall such that the one of these catalysts is arranged upstream from the other with respect to a direction in which the exhaust gas flows through the cell.

7. The method of claim 6, further comprising:
trapping the reducing agent and/or derivatives thereof contained in the exhaust gas that has passed through the SCR catalyst; and
oxidizing the reducing agent and/or the derivatives if an amount of the trapped reducing agent and/or the trapped derivatives reach a predetermined value.

8. The method of claim 6, wherein
the composite catalyst and the catalyzed filter are housed in a single catalyst housing and are in tandem with each other such that the former is positioned upstream with respect to the direction of the exhaust gas flow.

* * * * *